(No Model.)

A. C. FUNK.
SOIL PULVERIZER AND LEVELER.

No. 316,889. Patented Apr. 28, 1885.

WITNESSES:

INVENTOR:
A. C. Funk
BY Munn & Co.
ATTORNEYS.

UNITED STATES PATENT OFFICE.

ABSALOM CLARK FUNK, OF MONTICELLO, ILLINOIS.

SOIL PULVERIZER AND LEVELER.

SPECIFICATION forming part of Letters Patent No. 316,889, dated April 28, 1885.

Application filed December 6, 1884. (No model.)

*To all whom it may concern:*

Be it known that I, ABSALOM CLARK FUNK, of Monticello, in the county of Piatt and State of Illinois, have invented a new and Improved Soil Pulverizer and Leveler, of which the following is a full, clear, and exact description.

Reference is to be had to the accompanying drawings, forming part of this specification, in which similar letters of reference indicate corresponding parts in all the figures.

Figure 1:
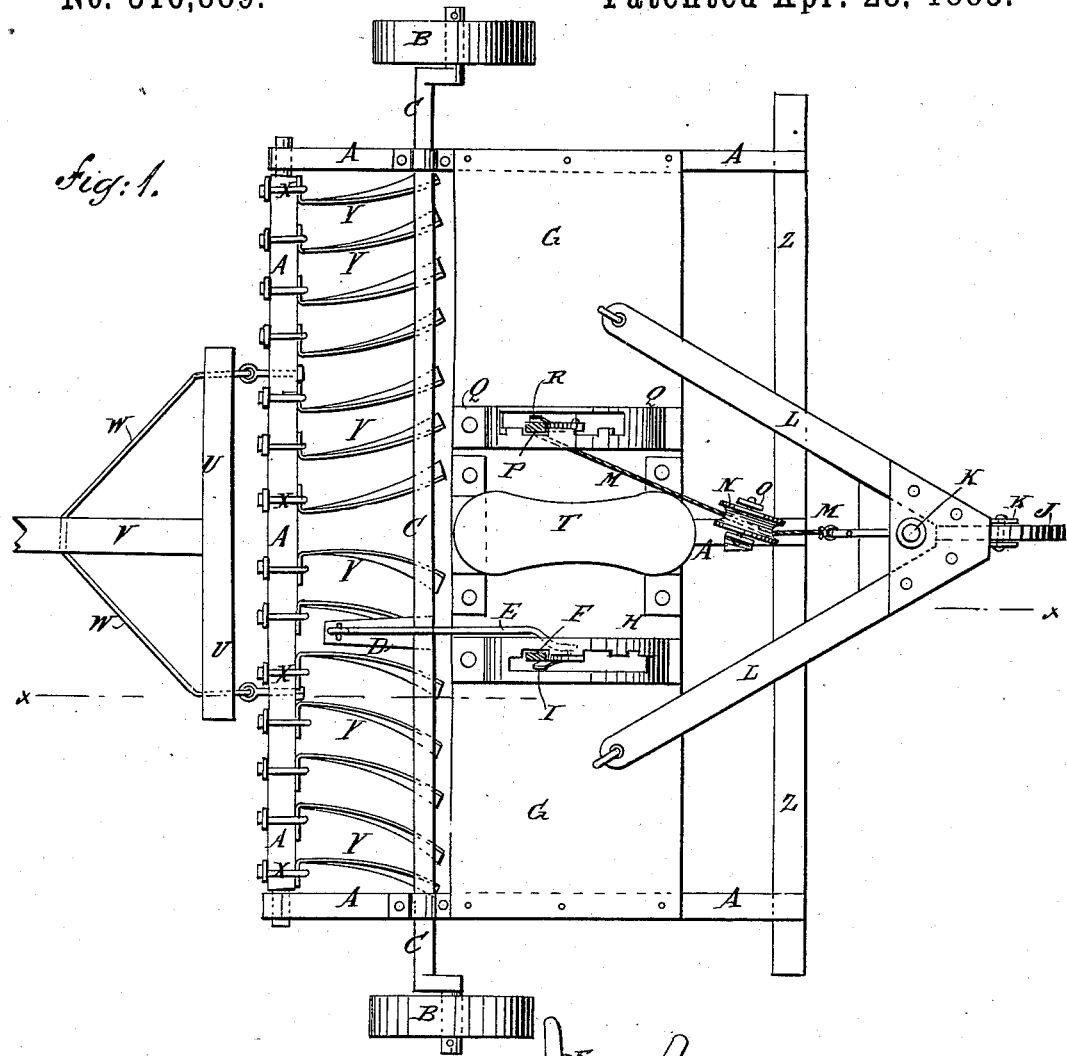
Figure 2:
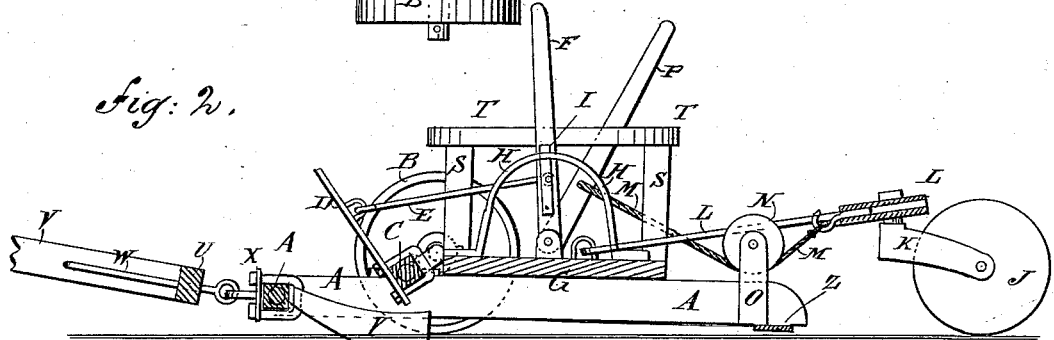

Figure 1 is a plan view of one of my improved pulverizers and levelers. Fig. 2 is a sectional side elevation of the pulverizer and leveler, taken through the broken line $x\ x$, Fig. 1.

The object of this invention is to provide machines for pulverizing and leveling the soil, and which shall be so constructed as to do the work rapidly and thoroughly.

The invention consists in a soil pulverizer and leveler constructed with a frame supported adjustably upon wheels, and provided at its forward part with twisted knives to cut the soil or sod into strips and turn the strips, and at its rear end with a steel plate to cut in pieces clods and shave off projecting parts of the soil. To the crank-axle is attached an arm connected by a rod with a lever pivoted to the platform and provided with a catch-bar and spring, whereby the forward part of the machine can be readily raised and lowered. To the platform is hinged a frame supported by a caster-wheel, and connected by a rope or chain passing around a pulley with a lever pivoted to the platform, and provided with a catch-bar and spring, whereby the rear part of the machine can be readily raised and lowered, as will be hereinafter fully described.

A is the frame of the machine. B are the wheels, the axle C of which rocks in bearings attached to the forward parts of the frame A. The axle C is made with offsets or cranks at its ends, so that the forward part of the machine can be raised and lowered by turning the said axle in its bearings.

To the axle C is rigidly attached the end of an arm, D, to the other end of which is pivoted the end of a rod, E. The other end of the rod E is attached to the lever F, which is pivoted at its lower end to the platform G, attached to the frame A. The lever F moves along a slot in an arched bar, H, the ends of which are attached to the platform G. In the bar H, along one edge of its slot, are formed recesses to receive the lever F and hold it in any position into which it may be adjusted. The lever F is held against the notched edge of the bar H by a spring, I, attached to it, and which rests against the said bar at the smooth edge of its slot.

The rear part of the machine is supported by a caster-wheel, J, the standard K of which is swiveled to the angular part of the V-shaped frame L. The ends of the arms of the V-shaped frame L are hinged by staples or other suitable means to the platform G.

To the angular part of the frame L, or to an arm attached to the said part, are secured the ends of a rope or chain, M, which passes around a pulley, N, pivoted to a support, O, attached to the rear middle part of the platform G. The other end of the rope or chain M is attached to a lever, P, the lower end of which is pivoted to the platform G or to a support attached to the said platform. The lever P moves along a slot in an arched bar, Q, attached at its ends to the platform G, and recessed along one edge of its slot to receive the said lever and hold it in any position into which it may be adjusted. The lever P is held against the recessed edge of the slot in the bar Q by a spring, R, attached to the said lever, and which rests against the smooth edge of the said slot. With this construction the rear part of the frame A can be raised and lowered by operating the lever P.

To the middle part of the platform G are attached standards S, to the upper ends of which is attached the driver's seat T, so that the said seat will be between the levers F P, to allow the driver to readily reach and operate the said levers.

To the front bar of the frame A are hinged the end parts of the cross-bar U, to the center of which is attached the rear end of the tongue V, the connection being strengthened by inclined braces W, attached to the said tongue and cross-bar.

To the front bar of the frame A, at points about four inches (more or less) from each other, are secured by clips X or other suitable means the forward ends of the knives Y, which are so shaped that the tops of their rear parts will be about upon a level with the lower side of the said front bar. The knives Y are made with a quarter twist, so that their forward parts will cut the sod or soil into strips, and their rear parts will turn the said strips over in the manner of plow mold-boards.

To the lower side of the rear end of the frame A is attached a thin and narrow plate, Z, of steel, to cut clods in pieces and to shave off projecting parts of the soil, and leave the surface of the ground level and smooth.

Having thus fully described my invention, I claim as new and desire to secure by Letters Patent—

1. A soil pulverizer and leveler constructed substantially as herein shown and described, and consisting of a frame supported adjustably upon wheels, and provided at its forward part with twisted knives, to cut the soil or sod into strips, and at its rear end with a steel plate, to cut in pieces clods and shave off projecting parts of the soil, as set forth.

2. In a soil pulverizer and leveler, the combination of the frame A, mounted at its forward end on wheels B, the platform G midway on said frame, the frame L, hinged at its forward end midway upon the said platform and mounted at its rear end upon a caster-wheel, J K, the pulley N, mounted on the rear end of frame A, the lever P, pivoted on the platform, the catch-bar Q, the spring-detent R, and the chain M, attached at one end to the said lever, attached at the other end to the frame L, near the rear end thereof, and passing midway under the pulley N, substantially as shown and described.

ABSALOM CLARK FUNK.

Witnesses:
  JOHN R. DORE,
  ANDREW L. RODGERS.